United States Patent
Richardson et al.

(10) Patent No.: US 6,292,803 B1
(45) Date of Patent: *Sep. 18, 2001

(54) OBJECT STATE CHANGE AND HISTORY MANAGEMENT MECHANISM

(75) Inventors: James P. Richardson, St. Paul; Mukul B. Agrawal, Plymouth, both of MN (US)

(73) Assignee: Honeywell International Inc., Morristown, NJ (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/972,403

(22) Filed: Nov. 18, 1997

(51) Int. Cl.[7] .................................................. G06F 17/30
(52) U.S. Cl. .................................................. 707/102; 707/2
(58) Field of Search ......................................... 707/2, 203

(56) References Cited

U.S. PATENT DOCUMENTS

| | | | | |
|---|---|---|---|---|
| 5,315,703 | * | 5/1994 | Matheny et al. | 345/507 |
| 5,583,982 | * | 12/1996 | Matheny et al. | 395/182.18 |
| 5,684,945 | * | 11/1997 | Chen et al. | 395/182.18 |
| 5,717,877 | * | 2/1998 | Orton et al. | 345/326 |
| 5,777,621 | * | 7/1998 | Schneider et al. | 345/428 |
| 5,799,318 | * | 8/1998 | Cardinal et al. | 707/104 |
| 5,815,415 | * | 9/1998 | Bentley et al. | 364/578 |

OTHER PUBLICATIONS

"DARPA Proposal", Honeywell Proprietary, 1–61, (Sep. 27, 1996).

"Potential JFACC Technologies", (Jul. 23, 1996).

Richardson, J., et al., "Information Management for Monitoring and Control", Honeywell Technology Center, (Aug. 9, 1996).

* cited by examiner

*Primary Examiner*—Wayne Amsbury
(74) *Attorney, Agent, or Firm*—John G. Shudy, Jr.

(57) ABSTRACT

A system of managing changes in the states of interrelated objects provides for synchronization of change notifications transferred between source and target objects. In one embodiment, target objects subscribe to state changes in source objects and the change notifications are provided with unique temporal state identifiers such as a system time stamp or an assigned number to provide a temporal dimension and allow synchronization of the notifications at the target object. The state changes are actually in the form of methods applied to the source, and equivalent or identical methods are then applied to the target. A log of change notifications is provided, and each of the notifications are applied to the target object to synchronize it with relevant source objects to which it is dependent upon and to a particular selected point in time. The source objects comprise relational database objects, objects as in object-oriented systems and objects representing physical phenomena; and the target objects comprise views of data in the source objects.

38 Claims, 5 Drawing Sheets

OBJECT STATE CHANGE AND HISTORY MANAGEMENT MECHANISM

THE STATEMENT OF GOVERNMENT RIGHTS

The invention was made with ba grant from the Government of the United States of America (Grant #F30602-96-C-0130 with Rome Labs). The Government may have certain rights in the invention.

FIELD OF THE INVENTION

The present invention relates to the management of objects in a computer system, and in particular to the tracking of state change and history of objects.

BACKGROUND OF THE INVENTION

Databases contain information, commonly in a relational form that can be queried and presented to a user. Query languages were used to describe the data that was to be retrieved from a database, and also to describe how it was to be organized for viewing by a user.

Many new software applications, including databases, are written using object oriented languages. The use of object oriented languages generally results in the encapsulation of data in containers called objects, which contain data or code or a combination of both. The objects are related together in a hierarchy. The objects have a number of functions called methods that can be applied to them to manipulate the data within them or cause them to perform a function. Display objects are used to present information to a user, by receiving data from the database objects and processing it in a desired manner to provide a view of the data to a user.

In prior programs, display objects subscribed to receive change notifications from the database objects when data in the database object changed. Initially, the change notifications were very primitive, just indicating that a change had occurred. It was then up to the display object to actually generate a communication to ask the database object for the new information, or rerun the query.

Improvements to the change notifications removed the need for back and forth communications to obtain the data that changed. Newer object models include typed event services, which provide self contained update notices. Display objects, sometimes referred to as target objects are able to receive updates from source objects and immediately process the new data to update the display. In the case of a target display display object, that meant providing an updated display of the information, whether directly, or following some permutation into a desired format, such as a graphical representation.

The form of the updates is different than one would expect in prior programming environments. The updates are actually in the form of methods or functions that were applied to the source object to update the data as in the case of a database source object. Thus, the method "insert" would specify what datum to insert where in a table. The change notification then would specify the same method or an equivalent method to be applied to the target object. The target object would then perform the appropriate method or function to change its operation consistent with the change in the source object.

The use of applying equivalent methods to source and target objects works very well when there is consistency between the source and target object. When they both start in the same state, change notices work very well, as volumes of data need not be transferred or processed each time a change occurs in the source object. Only the changes need to be applied consistently to each object.

While the source and target objects have been described so far as a database and display objects, there are many different target objects in an application whose state is a function of another object or objects' states. The target objects are sometimes referred to as a view. These views allow users and applications to define their informational needs and to be notified of new or changed information that is relevant to their view of the data. The source objects may not only be databases, but other objects as well, including but not limited to objects representing live real-world entities.

One problem with the method of change notification is that new target objects or views need a way to become initialized in the correct state. The current methods of change notification provide no mechanism for this to occur. Further, there is no means of synchronizing the source and target object to ensure that they are applying changes to the same data.

Relational database management systems have implemented the concept of views for many years. Basically, a view is a derived subset of data referred to as a table. The contents of the table are defined by a query posed against other tables in the database. For example, a view can be defined as all records in a table for the month of July. Relational views were originally frozen in time. They represented that state of the database at a particular point in time. Whenever an application required the content of the view, it had to be completely recomputed from the underlying data. Techniques were developed to intercept incremental changes to the source tables and determine if they affected the content of the view. If they did, the incremental update was performed on the materialization of the view. This added significant complexity and consumed much system resource. Further, a relational database management system has trouble dealing with unstructured data such as maps, and cannot support incremental updates to the map or perform operations such as map cropping.

There is a need for a better way to track and update state changes to objects and the objects that depend on their states. There is a need to provide such a way for unstructured data, such as maps. There is a further need to synchronize related objects when one of the objects changes states and to ensure that they continue to remain synchronized. There is yet a further need to track the history of changes and to be able to traverse historical states of sets of objects. Still further, is a need to offer users flexibility in defining views which filter the massive amounts of information available into views of the data that provide them with only the information that they need.

SUMMARY OF THE INVENTION

A system of managing changes in state of interrelated objects provides for synchronization of change notifications transferred between source and target objects. In one embodiment, target objects subscribe to state changes in source objects and the change notifications are provided with unique state identifiers such as a system time stamp or an assigned number to provide a temporal dimension and allow synchronization of the notifications at the target object. The state changes are actually in the form of methods applied to the source, and equivalent or identical methods are then invoked on the target.

In a further embodiment, when a new target object is instantiated or becomes active, a complete history of change notifications is provided, and each of the notifications are applied to the target object to synchronize it with relevant source objects to which it is dependent upon. This essentially synchronizes the target object with the present states of the source objects.

Several services comprising methods are provided to enable the system of change notifications. A get_current_state method is invoked to bring a target object from an initial state to a current state of a source object. Subscribe and unsubscribe methods are used to manage if and when a target object is to be initialized and be updated periodically. History type methods are used to place an object in a state consistent with a desired time from a past or current state.

One embodiment of an application implementing this system of change notifications comprises a simulation of a military air encounter, having an animated map with moving icons showing enemy flights over a region of interest. A target object referred to as a view is defined by composing basic view functions. An animated map object is updated whenever an underlying continental map changes, aircraft positions are updated in a situation database object or the region of interest is changed by a user viewing the action on a display. Histories of the source object updates permit reconstruction of the map for any point in time and enables provision of new views without transferring entire states for each source object. Several different views are provided, each allowing different users to do their jobs. One view includes an air operations center planner view showing all target objectives. A wing operations center planner may select from either a target objectives for the wing with a platform assignment status or a map overlay. A simulation operator views all platforms with operational status.

Further applications are most likely to occur in a broad variety of monitoring and control environments. Industrial process control, utilities, manufacturing and financial applications all may benefit from the present invention. Each has large amounts of data generated where each user may need a different view of the data. The present invention provides a very general way to provide the views through an efficient event driven architecture.

DESCRIPTION OF THE EMBODIMENTS

Figure 1:
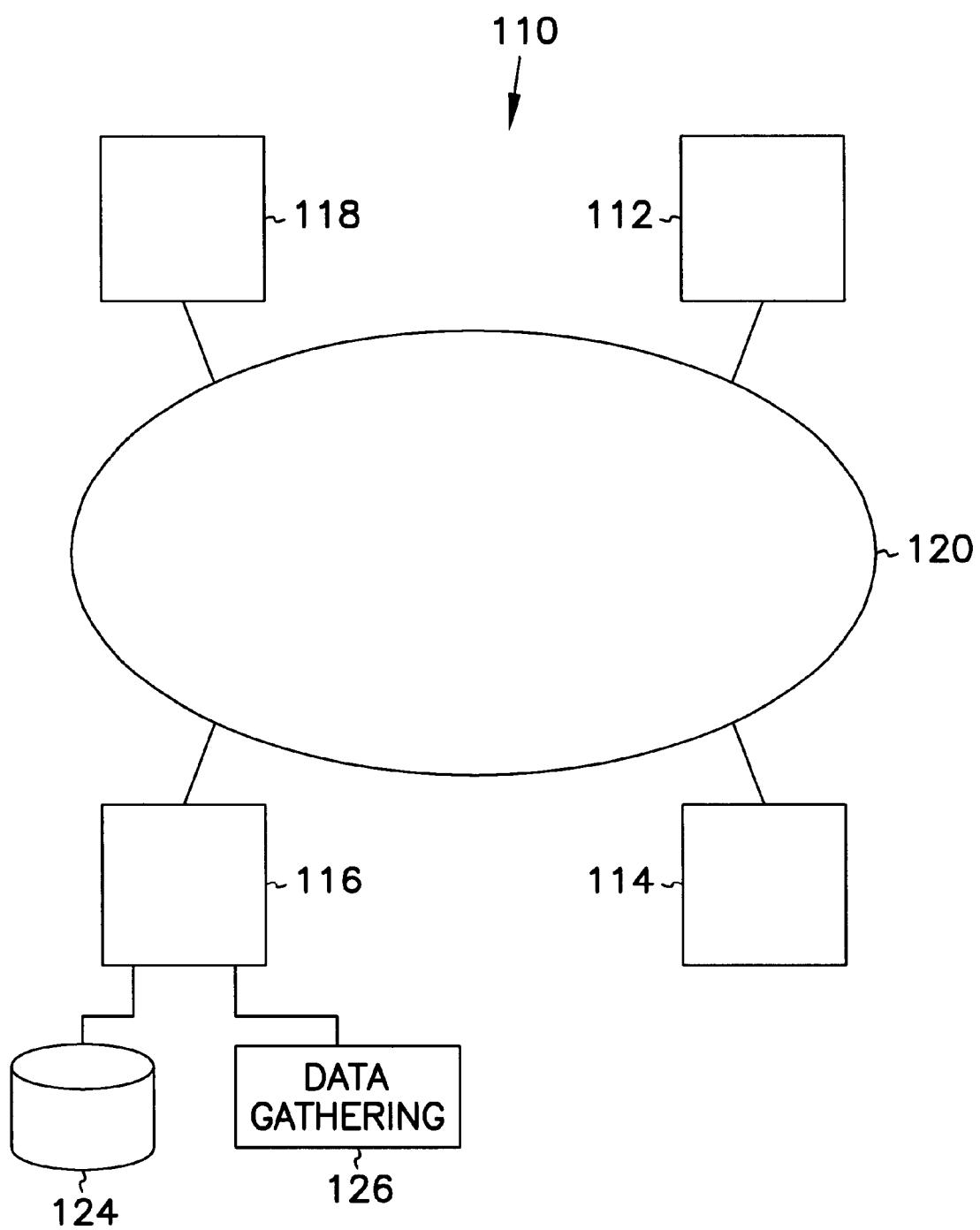
FIG. 1 is a block diagram of a networked computer system which incorporates the present invention.

In the following detailed description, reference is made to the accompanying drawings which form a part hereof, and in which is shown by way of illustration specific embodiments in which the invention may be practiced. These embodiments are described in sufficient detail to enable those skilled in the art to practice the invention, and it is to be understood that other embodiments may be utilized and that structural, logical and electrical changes may be made without departing from the spirit and scope of the present invention. The following detailed description is, therefore, not to be taken in a limiting sense, and the scope of the present invention is defined by the appended claims.

A basic description of objects and their characteristics as used in this invention will first be described, followed by a description of a typical network of computers to provide a context for the invention. Then the invention will be described in relation to a simulation of a geographically dispersed engagement, and how multiple views of the data collected by the computer network are provided to different people involved in the control and monitoring of the simulation. Further details of how to construct the views of the data and the programming used to manage the views will then be described.

The present invention is described with respect to an embodiment using an object oriented architecture. Every object (an encapsulated collection of data and/or programming) has an interface that defines the operations that may be performed on the object. Using a stack object as an example, the operations are push, pop and top. A request is a value that identifies an operation to be performed on an object and the parameter values for the operation. Similarly, a response is a value that the object returns upon completion of the operation. An object has a time varying abstract state. For the stack object, the abstract state is the sequence of elements currently on the stack. An object's response to a request is a function of the object's current abstract state and the request. The object's new abstract state is also a function of the object's current abstract state and the request. Operations can be divided into two classes, accessor operations which do not modify the state of the object, and mutator operations which do modify the state.

For a passive object, the state changes only when a request is sent to it. The state is therefore a summary of all previous requests against the object. An active object's state may change asynchronously due to internal processing or other interactions not visible at the object's interface. The abstract state may not be directly accessible via requests and responses. For instance, the state of a stack cannot be determined except by repeated pop operations that also modify the state.

An object's type defines the semantics of an object—its behavior as observed at its interface. If two passive objects having the same type are created and then the same sequence of requests is sent to them, they will be in the same state after processing the requests.

In FIG. 1, a typical network of computers is shown generally at 110. Multiple computers indicated at 112, 114, 116, and 118 are coupled by a network 120, such as an Ethernet type of network or other network. The computers are used by users to both collect data via sensors or other data collection devices, including people manually entering information. The information and data collected is stored in databases such as represented at storage device 124. The information and data may be stored in relational databases, or may be object based, as is well known in the art. Other computers coupled to the network 120 may run applications which handle the collection and processing of data. The simulation mentioned above is one such application. The computers will provide views of the simulation, or output based on the data in the databases as processed by the simulation. The views may be provided by encapsulated computer programs, referred to as objects.

A view object is an object O whose state is a function of the state of one or more source objects: $O=F(O1, \ldots, On)$. The source objects may be certain collections of data which are stored on storage device 124 as well as at least partially in working memory of the computers. When the source objects are updated, the state of the view object changes accordingly to maintain the functional relationship. F is referred to as a view function. The view function F can perform data reduction, data formula translation, or perhaps just elimination of irrelevant detail from the source objects.

As an example, suppose we want to be able to monitor enemy sorties within a geographical region of interest in a computer simulation or real-time actual engagement such as a search and rescue operation. The desired view object is a digitized regional map overlaid with animated icons of enemy sorties. Assume that available source objects include a digitized map of the entire continent containing the region of interest, a situation database containing records of current enemy sortie sizes, positions, and directions for the entire continent, and an object specifying the coordinates of the region of interest. Whenever one of these source objects is updated, e.g. a bridge is destroyed (affecting the map) or a sortie moves, the animated map must be updated accordingly.

Figure 2:
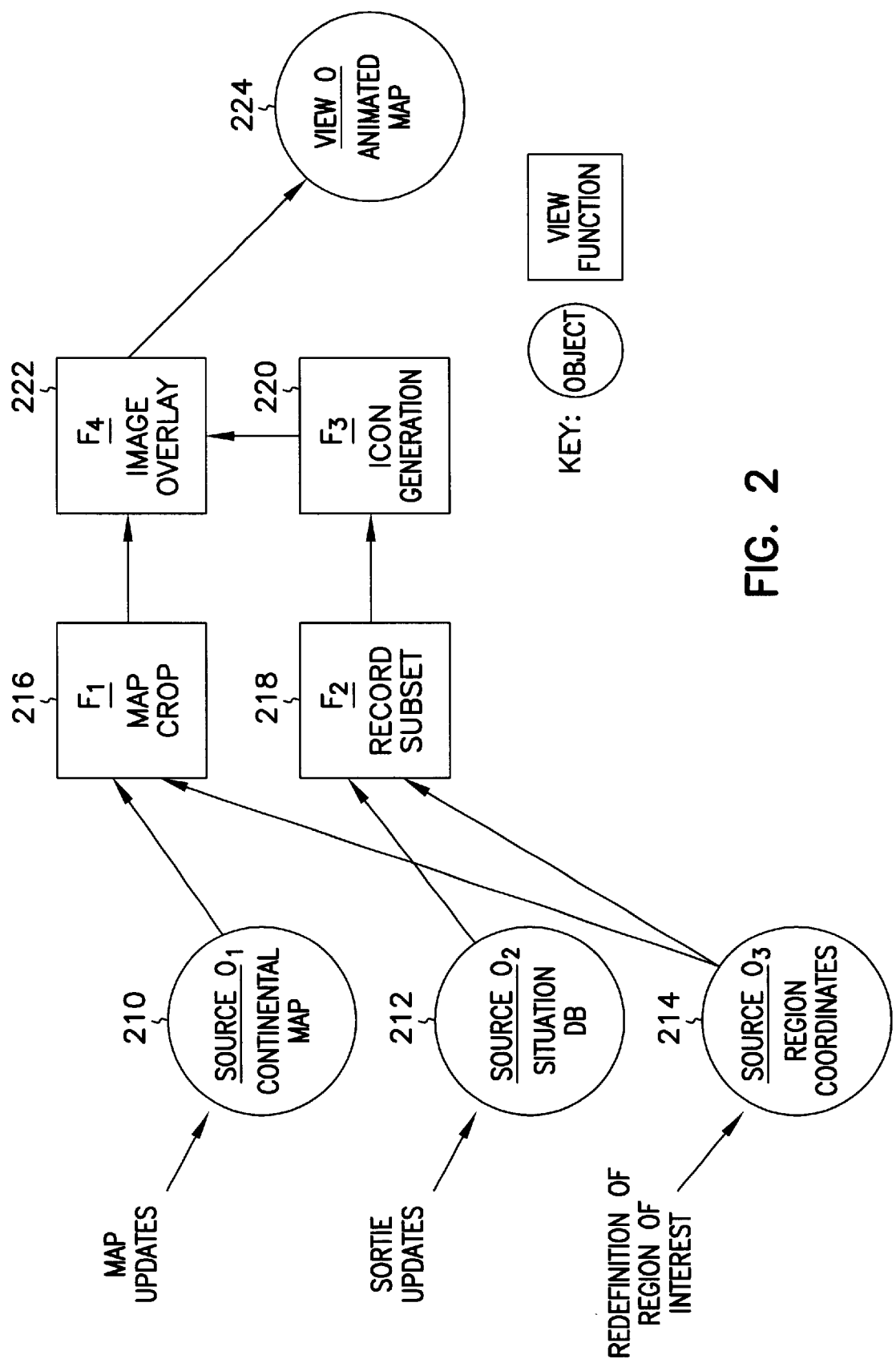
FIG. 2 is a block representation of source objects and the functions applied to them to create view objects.

In FIG. 2, source objects 210, 212 and 214 represent a continental map, a situation database and region coordinates respectively. Referring back to FIG. 1, each source object may be provided and updated by a different computer and stored in a single database or multiple distributed databases. They each receive updated information from sensors or user entered information. Two view functions from a view function library have been selected to receive selected information from the source objects. A map cropping function 216 receives map updates from source object 210 and region coordinates from object 214. A record subset view function 218 receives the region coordinates from object 214 and situation information from source object 212. An icon generation view function 220 receives processed information from view function 218 and generates icons representative of sorties. View function 220 then provides the icon representations to an image overlay view function 222 which also ;receives map crop information from view function 216. The image overlay function provides a cropped view of the map with associated sortie icons to a view object 224, which may be viewed by a user on a standard display apparatus.

The advantages of such an arrangement of objects and functions are many. The declarative nature of views first realized in relational databases are retained. They are easier to specify and more amenable to automated analysis and performance optimization. In other words, the data may be significantly processed to create the view, such as in the case above, where sortie icons may be actually be graphically processed to visually represent the underlying data in a much more user friendly manner than is possible with simple queries previously used. The views can be applied to any type of object, not just persistent collection objects managed by a database management system. The animated map object defined above is an example. The class of view functions is broader than those expressible in database query languages. They include programmer-defined, type-specific functions and compositions of those functions. As a result, views can be used for defining a user's information needs, performing data representation mappings for legacy databases and applications, and a variety of other purposes.

Figure 3:
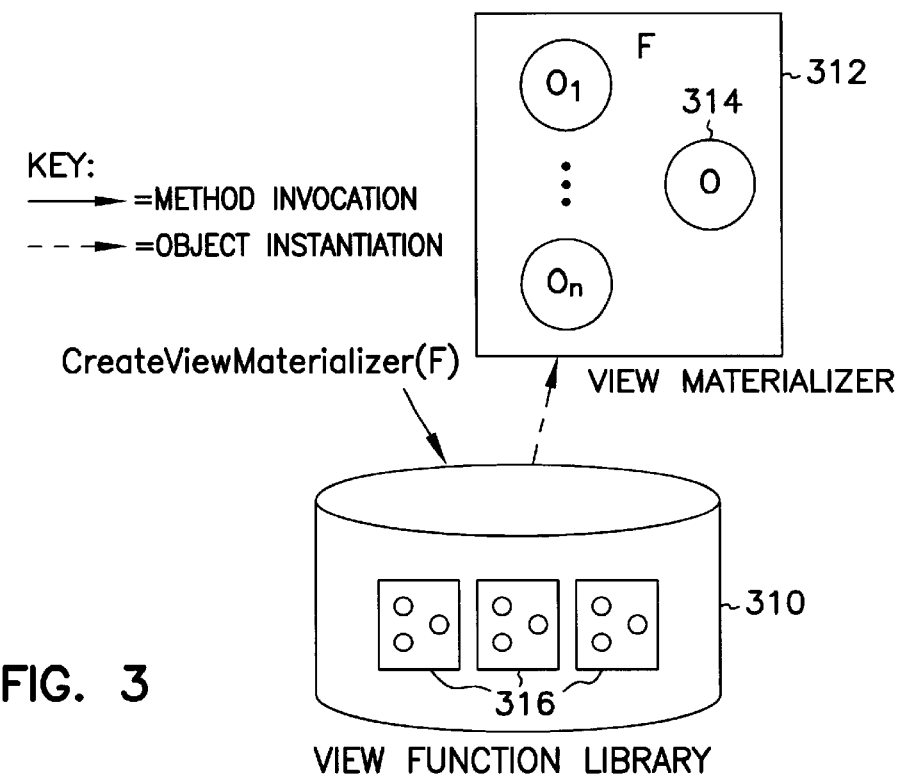
FIG. 3 is a block diagram representation of the operation of a view materializer.

Views may be created by selecting functions from a function library 310 by use of a graphical tool as represented in FIG. 3. A view materializer as represented at 312 is an object that contains a fixed set of source objects of specific types and generally a single view object of a specific type. It represents a specific view function F and maintains that functional relationship between the source and view objects' states using a hard coded algorithm. Materializer 312 shows multiple source objects from which the view may be created. There are several versions of visual programming tools on the market for linking objects and functions in well known manners. As indicated at 312, a view object 314 is a function of source objects O1 through On. The relationship between the view object 314 and the source objects is defined by selection of view functions 316, which may be designed for generally useful object types such as sets, relations, sequences, images and text. Example functions include standard set operations, image matching, and text matching. The library may easily be extended to include functions related to multiple different complex monitoring and control applications, from search and rescue to industrial process control. It is much more flexible that standard query languages which provide static views of data.

Views may also be created via the use of a container object, also represented at 312. A container object provides a service to create view objects over the source objects that it contains. For example, a relational DBMS provides a service to create views over existing tables. The view creation service accepts an interpretable specification of the view function, such as a text string containing Structured Query Language (SQL) expressions. Any number of view objects can be defined within the container. It is the container object's responsibility to ensure that the functional relationship between the source and view objects' states is maintained.

Figure 4:
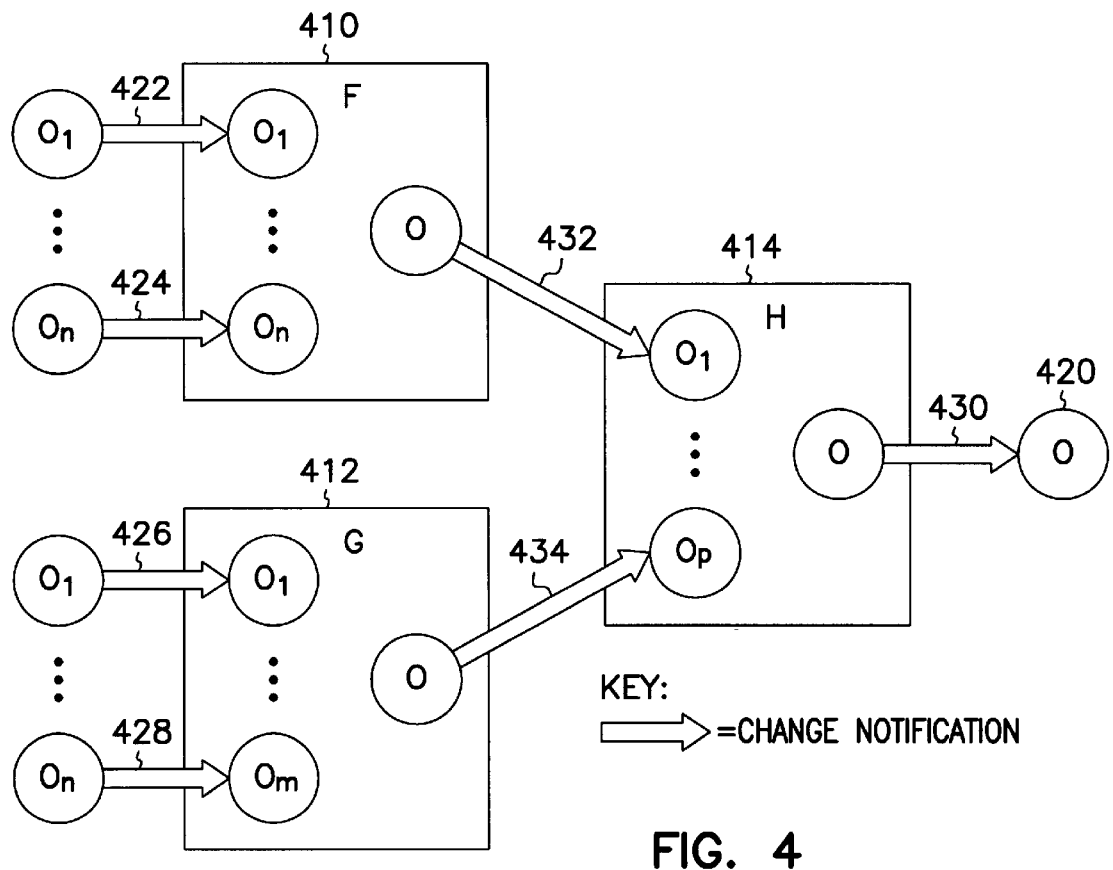
FIG. 4 is a block diagram representation of a view materializer and its use to create active views.

The composition of view functions is accomplished at run-time by linking the functions' view materializers through change notification as shown in FIG. 4. At this point, a mechanism will be described which permits a view to become active. An active view is a view object that receives change notifications from its source objects, and then modifies the view presented to the user or another object to which it is a source object.

Rather than providing a generic indication that a change has occurred, or sending a new copy of the entire source object data to the view object, the change notice comprises an indication of the actual action that took place to cause the change in the source object.

The change notice is applied to the target object, causing it to change in the same way as the source. In FIG. 4, several view materializers are shown at 410, 412 and 414, implementing functions F, G and H respectively to provide active views as a function of multiple source objects labeled O1 through On, Om, and Op. Note that the view objects created by functions F and G, as well as others are then used by function H to create a further view object 420. Further, it should be noted that each of the source objects provides change notifications as indicated by the double lined arrows 422, 424, 426, 428, 430, 432 and 434 to the materializers which then apply the changes in accordance with selected functions to create the view objects.

Figure 5:
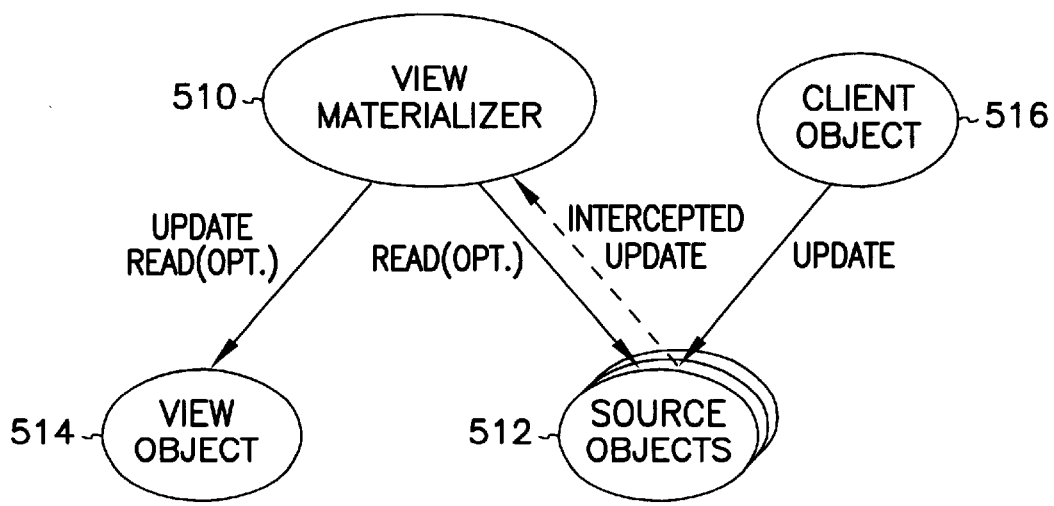
FIG. 5 is a block diagram representation of the interaction of a view materializer with multiple objects.

Further detail regarding the view materializer is provided with reference to FIG. 5. A view materializer 510 initially extracts sufficient information from source objects at 512 to bring a view object 514 to a correct state. A client object 516 may then provide updates to the source objects 512, such as information regarding the change of a measured physical condition, such as temperature, level, flow or pressure in process control environment. The view materializer 510 then intercepts each update operation on a source object, and operates on the view object 514 to restore the proper relationship between the view and the changed source object. The operation invoked on one of the source objects is applied to the view object, which is of the same or compatible type. Any parameter used to update the source object are also used on the view object. The materializers accumulated internal state is also used to ensure that the change is properly applied to the view object. Optionally, the current states of each of the source objects may also be obtained form the source objects and applied. Where a source object is a complex object such as a stack, this is particularly difficult, since the source object will have to be cycled through its stack, with care taken to ensure that the operation is atomic, and that the stack is left in the same condition as at the start of the cycle.

One key element in the provision of change notifications, is the provision of an object comprising a log of change notifications. Change notifications are first class values that can be stored, transmitted, and applied to other objects to keep their state in synchronization with that of the source object The purpose of a change notification is to allow an object, such as a source object, to notify other objects of a change to its abstract state. The notification indicates that the state has changed, and also specifies exactly how it has changed. It contains sufficient information to enable a target object to keep in a synchronized state.

A change notification is a request, in fact, the same request that caused the source object to change its state. Only mutator operations appear in change notifications since those are defined as the only operations that cause a change in state. If the source object is an active object that changes state independently of any external request, it emits a change notification as if it received a request that caused the state change. By applying the same or equivalent mutator operation, the target object is kept synchronized with the source object. The source and target objects should be of the same type, but need not have the same implementation. In other words, the target object could have an alarm triggered as a side effect of application of a change. One of the benefits of using change notifications is that the entire new state of the source object, which could be very large, is not communicated, tying up a network and processing resources. Further, since it is not always easy to access the state of an object, it could be very difficult and sometimes impossible to access the current state.

Figure 6:
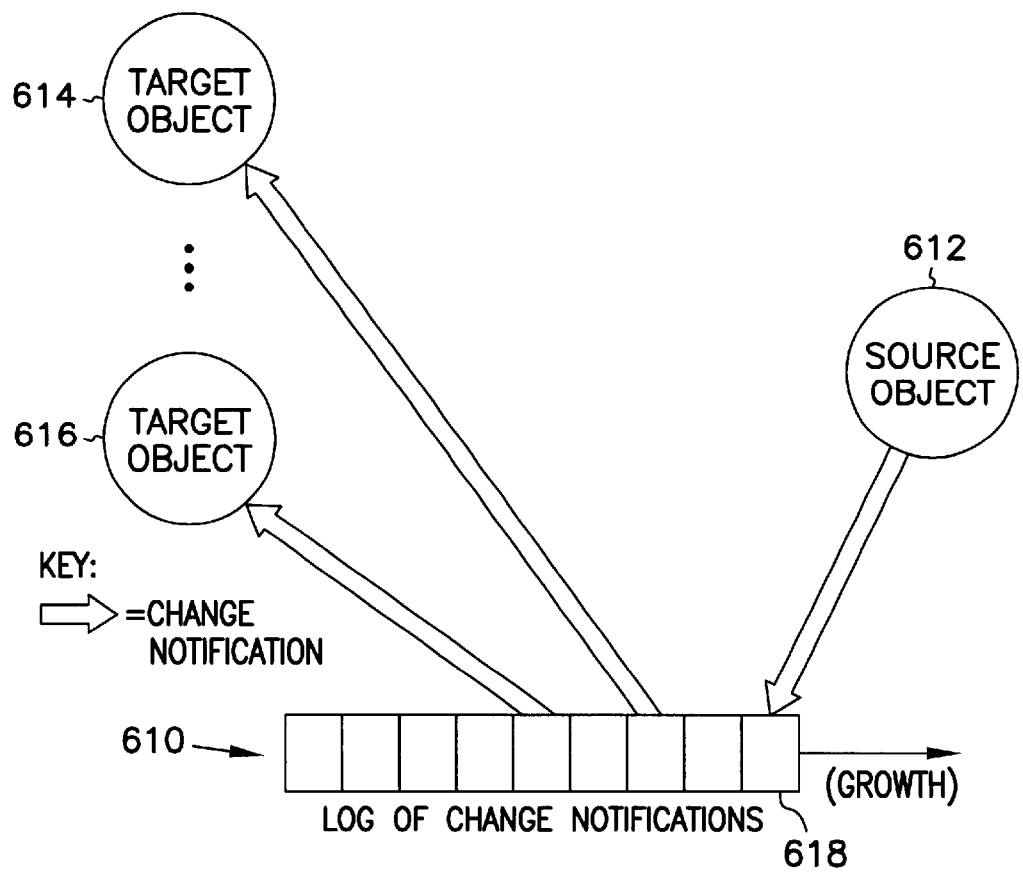
FIG. 6 is a block diagram representation of the interaction of a log of change notifications with source and target objects.

The purpose of a log, as shown at 610 in FIG. 6 is to record change notifications applied to a source object 612 so that they can be passed asynchronously to one or more target objects 614, 616. It must be possible for multiple target objects to obtain the log entries. The log may be condensed. Each target object may obtain the entire sequence of change notifications emitted by the source object since its creation to the extent that information is available in the log. The most recent change notification is represented at 618. However, if a target object can be check pointed, then following a crash and recovery of the target object, it must be possible to obtain only those entries since the checkpoint. This in turn requires a mechanism such as a time stamp or sequence number to identify positions of requests in the log.

A timeliness quality of service specifies how long a delay may occur prior to updating the target object that is subscribing to changes in a source object. Providing information for the sequence of event tracking as opposed to state tracking ensures that the target object passes through the same sequence of states as the source object. Accuracy quality of service may allow the states of the source and target objects to differ by some amount. The motivation is that insignificant changes of state may not be worth applying to the target object. For instance, minor changes of a target's position as recorded in a situation database may not be reflected in animated maps. Each of the quality of service parameters allows a tradeoff with network bandwidth requirements. The network bandwidth requirements may be reduced by increasing delays, using state tracking and by relaxing accuracy in the state of the target object.

In one embodiment of the log, state tracking is used to reduce the number of requests applied to the target object. For example, intermediate states may be skipped, so long as timeliness quality of service requirements are met. In a contact debouncing monitoring situation (such as a security system door sensor), rapid contact closures and openings are filtered out, but a resting position of the contact is noted. In this manner, no change notifications were sent to a target object until the final resting state was determined. Further embodiments may track multiple algebraic modifications to the sequence of change notifications, and actually reduce the number of change notifications by combining them in a single or fewer operations using well known algebraic reduction techniques.

Figure 7:
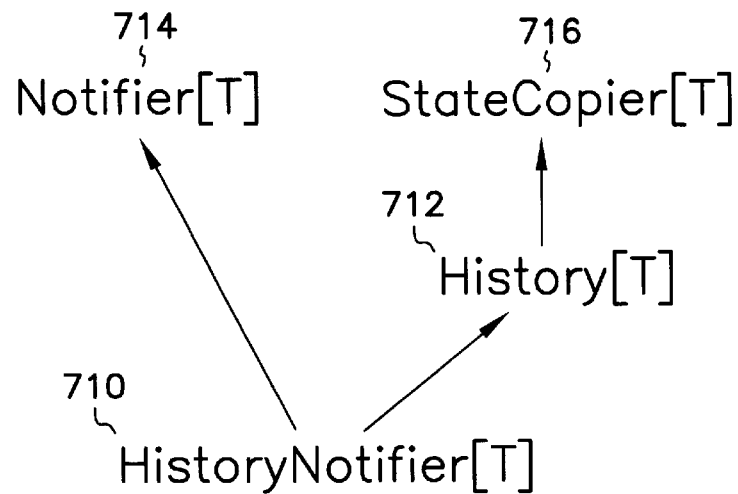
FIG. 7 is a block representation of multiple types of objects, showing their inheritance relationships.

Several types of services are provided for maintaining and communicating states of objects as shown in FIG. 7. A Notifier service type at 714 is used to subscribe and unsubscribe to a source object's change notifications. The invocation of this method takes the form of:

subscribe(in target: Mutable[T], qos: QoSType)

This invocation is used to bring the target object from an initial state to the current state of the source object, and then keep the target current with the source object by receiving all the change notifications from the source object.

unsubscribe(in target: Mutable[T]; out current_state_id: SID) is used to cancel the receipt of further change notifications from the source object.

A StateCopier service type at 716 is used to bring a target object from the initial state to the current state.

get_current_state(in target:Mutable[T]) brings a target object from the initial state to the current state.

A History service type at 712 provides several different functions to bring target objects to states from a selected time to a different selected time, either later than the initial state or earlier than the current state.

get_current_state_from past (in target: Mutable[T], starting state_id: SID; out current_state_id: SID) brings a target object from a past state to a current state of the source object.

get_past_state (in target: Mutable[T], starting_state_id: SID) brings a target object from an initial state to a past state of the source object.

get_past_state_from_past (in target: Mutable[T], starting_state_id: SID; ending_state_id: SID) brings target object from a past state to a later past state of the source object.

A HistoryNotifier type 710 is a method used to bring target objects from a past state to a current state of a source object, and then keep the target current with the source. The method is invoked by the following construct with parameters:

subscribe_from_past (in target: Mutable[T], starting_state_id: SID,
qos:QoSType)

The History and HistoryNotifier services types also provide, by inheritance, the methods defined by the more basic types as shown in FIG. 7.

Figure 8:
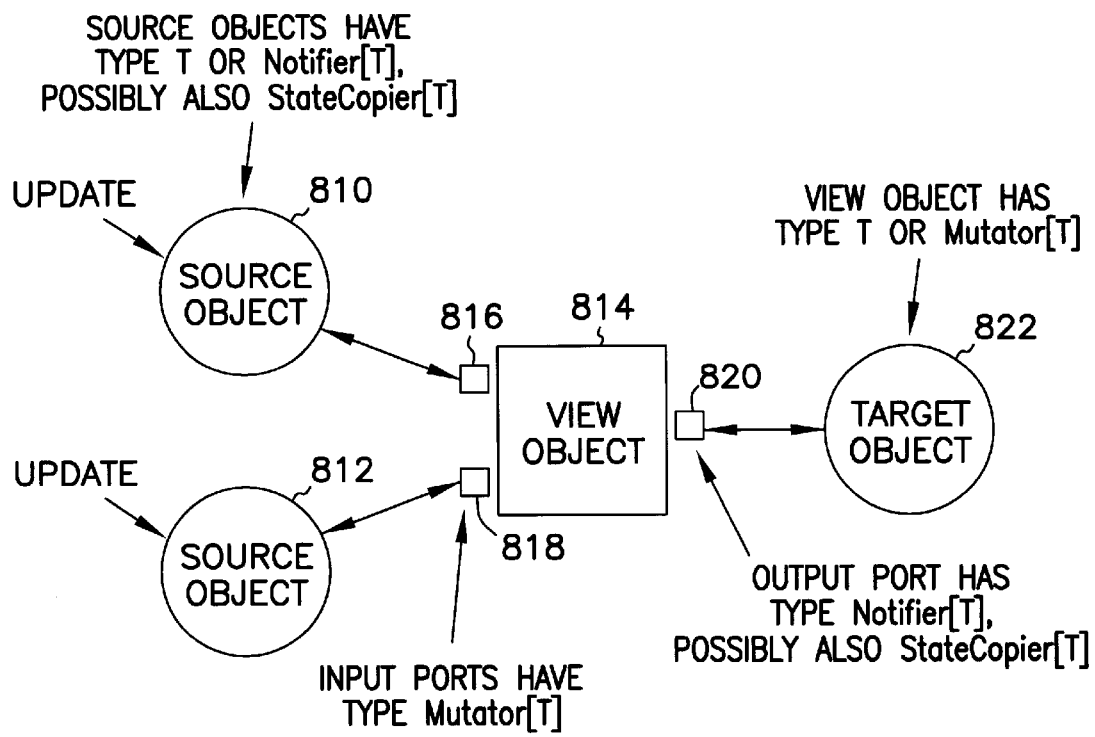
FIG. 8 is a block diagram representation of the interaction between a view object, source objects and target objects showing their types.

FIG. 8 shows a simple example of the use of object types in the provision of an application with active views in accordance with the present invention. One or more source objects 810, 812 are provided with the type Notifier or StateCopier as indicated. A view object 814 has input ports 816 and 818 having type Mutator, and being coupled respectively to source objects 810 and 812. An output port 820 of view object 814 has type Notifier or StateCopier and is coupled to a target object 822. Thus, source objects 810 and 812 normally provide change notifications as they occur and as required by quality of service parameters through the input and output ports of view object 814 to the target object 822 to keep it synchronized with the source objects as specified in the methods used to define the types.

Referring back to FIG. 2, it can be easily seen that the use of active views, and the services described above provides for a very robust ability to monitor and interact with representations of complex processes. For instance, an air operations center planner can easily configure a view object to monitor objectives and requirements, and assign and reassign objectives to wings. The view may show all target objectives. Further views may be provided and updated regarding different target objectives within a defined geographical area.

A wing operations center planner may assign specific platforms to target objectives and revise such assignments in case of platform failure. A first view may be defined to show target objectives assigned to the wing, with platform assignment status. A second view can easily be provided of a map overlaid with targets assigned to this wing.

A simulation operator may view all platforms with operational status. As can be seen, the simulation involves multiple users, each having very different viewing needs, and possible real time selection of different views. The services provided to update views are very flexible, and allow viewing of historical states, as well as very granular specification of desired updates regarding current states while efficiently utilizing resources. For instance, if a user did not need to observe one view for an extended period of time, there is no need to subscribe to the change notifications. Then, when a view is desired, the view may be quickly updated by using the proper services to apply all the changes logged in the logs associated with each source object.

With respect to relational databases, and the multiple queries that may be available for viewing, the present invention also provides advantages. Rather than having to rerun a query, or continually update each available view, the services again may be used to control which active views are updated on a real time basis, with quality of service parameters specified to help control the amount of resources that are dedicated to such active views.

In process control environments, the active views and services for managing the active views provide similar benefits. A plant operator may wish to view point, trend, alarm, and displays, while a maintenance engineer view may comprise equipment diagnostics and maintenance schedules. Further a process engineer view may comprise process efficiency calculations. Still further users of the system may monitor just in time supplies. Each user can easily configure their views, and view historical states at their convenience using the services provided.

It is to be understood that the above description is intended to be illustrative, and not restrictive. Services may be implemented in hardware, ASICs or software or any combination thereof. Further object oriented models may also be utilized. When the services and methods are implemented in software, they may be stored in any available computer readable medium as represented at 124, and executed normally from a random access memory associated directly with a processor. Such computer readable medium includes disk dives, floppy drives, CD ROM, tape, and even includes remote storage devices such as that accessible via network. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A system comprising:
   a source object comprising data, the source object having a state that can be changed by applying a method to it, and the source object capable of emitting a method applied to it as a change notification;
   a target object comprising data, the target object capable of receiving change notification and applying the method associated with each change notification received to the target object;
   a view materializer, comprising an input object that is a target object capable of receiving change notification from a source object, and further comprising a view object that is a function of the input object and that emits change notification such that the change notification may be received by one or more target objects;
   a notifier that implements the change notification, wherein the notifier communicates changes in data contained in a source object to a target object; and
   a quality of service parameter and wherein the notifier communicates changes based on the quality of service parameter.

2. The system of claim 1 comprising more than one source object, wherein the view object provides a view that is a function of the data from multiple source objects.

3. The system of claim 2 and further comprising functions for transforming the data from the multiple source objects in accordance with selected functions.

4. The system of claim 1 wherein the notifier comprises one or more methods selected from the group consisting of get_current_state_from_past, get_past_state, get_past_state_from_past, and subscribe_from_past.

5. The system of claim 1 wherein the notifier applies selected methods to a target object to bring the target object to a desired state in time.

6. The system of claim 5, wherein the desired state in time is identified by a unique temporal identifier.

7. The system of claim 1 and further comprising sensors coupled to the source objects.

8. The system of claim 1, wherein the one or more input objects function as target objects, such that the input objects receive change notification from source objects and apply the method associated with the change notification to data comprising the input object, and wherein the view materializer receives notification of the changed data and changes the view object consistent with the function defining the view object as a function of the one or more input objects.

9. The system of claim 1, wherein the one or more view objects function as source objects, such that they emit a change notification of changes applied to the one or more view objects to one or more target objects.

10. The system of claim 1, wherein the one or more target objects that receive change notification from a view object are further operable to function as source objects.

11. A system having a manager for managing changes in state of interrelated objects, the system comprising:
one or more source objects having a state representative of a physical state of a system;
one or more methods that update the source objects responsive to changes in the state of the system;
one or more change notifiers that communicate the changes;
a view materializer comprising one or more input objects capable of receiving change notification from source objects and further comprising one or more view objects that are a function of the input objects and that emit change notification, such that the change notification may be received by one or more target objects; and
a quality of service parameter and wherein the notifier communicates changes based on the quality of service parameter.

12. The system of claim 11 and further comprising a sensor for measuring a physical event and providing the source object with information representative of the physical event.

13. The system of claim 11 and wherein the change notifier comprises one or more methods selected from the group consisting of get_current_state_from_past, get_past_state, get_past_state_from_past, and subscribe_from_past.

14. The computer readable medium of claim 11 wherein the temporal identifier comprises a time stamp.

15. A system comprising:
a plurality of processor elements;
a network coupling the processor elements to each other;
a plurality of information sources coupled to the processor elements;
a source object having a state representative of information provided by the information sources;
a service running on at least one of the processor elements for applying methods to update the state of the source object responsive to changes in information provided by the information sources;
a view materializer comprising an input objects capable of receiving change notification from the source object and further comprising a view object that is a function of the input object and that emits change notification, such that the change notification may be received by a target object;
a notifier that implements the change notification, wherein the notifier communicates changes in data contained in a source object to a target object; and
a quality of service parameter and wherein the notifier communicates changes based on the quality of service parameter.

16. A state change manager for managing changes in state of interrelated objects comprising:
a source object having a state representative of a physical state of a system;
a method that updates the source object responsive to changes in the state of the system;
a change log that records changes to the source object and associates such changes with a chronologically related identifier;
a change notifier that communicates the changes to a view materializer;
a view materializer comprising an input object that receives change notification from source objects via the change the change notifier and further comprising a view object that is a function of the input object and that emits change notification, such that the change notification may be received by a target object; and
a quality of service parameter and wherein the change notifier communicates changes based on the quality of service parameter.

17. A machine-readable medium with instructions stored thereon, the instructions when executed on a computer operable to cause the computer to:
log changes in state of a source object in a format specifying a method applied to the source object to change its state, and temporal identifier; and
apply logged changes in state based on quality of service parameter to a target object which is a function of at least one source object in response to a request to synchronize the target object with respect to a desired state of the source object.

18. A method of synchronizing the state of a source object and a target object which is a function of at least one source object, comprising:
logging changes in state of a source object in format specifying a method applied to the source object to change its state, and chronological identifier;
requesting to synchronize the state of the target object with the source object at a desired point in time, wherein requesting includes identifying the target object and a desired quality of service; and
using logged methods applied to the source object to change the state of the target object to synchronize the state of the target object with the state of the source object at the desired point in time.

19. The method of claim 18, wherein the requesting step comprises identifying the target object and its starting state.

20. The method of claim 18, wherein the requesting step comprises identifying the target object, its starting state, and an ending state.

21. The method of claim 18, wherein using logged methods applied to the source object to change the state of the target object comprises applying the logged methods to input objects in a view materializer, such that the view materializer updates a view object which is a selected function of the input object, the view object further capable of emitting change notification of changes applied to the view object to a target object.

22. The system of claim 21 and further comprising multiple view objects wherein at least one view object is a function of multiple source and view objects as communicated by the notifier.

23. A system comprising:
a plurality of source objects containing information;
a first view object which is a function of the information contained in the source object;
a second view object which is a function at least in part of the view object; and
a notifier that communicates changes in the data contained in the source objects to the first view object such that the changes are applied to the first view object, and that communicates changes in the data contained in the first view object to the second view object to bring the second view object to a desired state in time, wherein the notifier notifies changes based on a quality of service parameter.

24. A computer system, comprising:

at least one object having a state; and another object that includes a state having a functional relationship to the state of the at least one object, wherein the functional relationship is selected from a group consisting of data reduction, data formula translation, and data elimination, and wherein the state of the other object changes to maintain the functional relationship.

25. The system of claim 24, further comprising a collection of functional relationships, wherein at least one functional relationship of the collection of functional relationships defines the functional relationship between the state of the another object to the state of the at least one object.

26. The system of claim 25, wherein the collection of functional relationships is adapted to work for a type selected from a group consisting of sets, relations, sequences, images, and text.

27. The system of claim 24, further comprising at least one materializer that contains the at least one object, the another object, and the functional relationship between the at least one object and the another object, and wherein the at least one materializer maintains the functional relationship in accordance with a predetermined algorithm.

28. The system of claim 27, wherein the at least one materializer includes at least two materializers having different functional relationships, wherein one of the at least two materializers depends on the other of the at least two materializers, and wherein when the other of the at least two materializers receives an actual action that took place to cause a change, the state of the another object of the one of the at least two materializers changes to maintain the functional relationship.

29. A computerized method, comprising:

updating at least one object by a client object;

intercepting each act of updating by at least one materializer; and restoring a functional relationship between another object and the at least one object, wherein the functional relationship is selected from a group consisting of data reduction, data formula translation, and data elimination, and wherein the act of restoring is executed after the act of intercepting.

30. The method of claim 29, further comprising extracting information from the at least one object by at least one materializer and bringing the another object to a desired state using the information.

31. The method of claim 29, further comprising logging changes to the at least one object by a log instance so as to asynchronously pass the changes to at least one target object, and wherein the log instance persists the changes.

32. The method of claim 29, further comprising specifying a quality of service, wherein the quality of service is selected from a group consisting of timeliness quality of service and accuracy quality of service.

33. The method of claim 29, further comprising skipping at least one desired change, which is logged, wherein skipping includes reducing by algebraic reduction techniques.

34. A data structure, comprising:

a state copier to change an initial state of a target to a current state;

a history that extends the state copier to bring the target from one time to another time;

a notifier that selectively subscribes to change notifications of a source; and a history notifier that extends the history and the notifier to change the target from a past state to a current state of the source, and wherein the history notifier keeps the target current with the source.

35. The data structure of claim 34, wherein the state copier includes a method member for bringing the target to a current state from an initial state, and wherein the method member receives a mutable target.

36. The data structure of claim 34, wherein the history includes three method members, wherein the first method member of the three method members is an act for bringing the target to a current state of the source from a past state, wherein the second method member of the three method members is an act for bringing the target to the past ststae of the source object from an initial state, and wherein the third method member of the three method members is an act for bringing the target to a later past state of the sourcefrom the past state.

37. The data structure of claim 34, wherein the notifier includes two method members, wherein the first method member of the two method members is an act for subscribing to receive change notifications of the source, wherein the first method member receives a desired quality of service, wherein the second method member of the two method members is an act for unscribing to cancel the receipt of change notifications of the source.

38. The data structure of claim 34, wherein the history notifier includes a method member for subscribing to a current state of the source such that the target is brought from a past state to the current state of the source, and wherein the state of the target is kept current with the source.

\* \* \* \* \*